United States Patent
Wolf et al.

[11] Patent Number: 5,881,458
[45] Date of Patent: Mar. 16, 1999

[54] PROCESS FOR MANUFACTURING A BODY STRUCTURE FOR A CONVERTIBLE

[75] Inventors: Andreas M. Wolf, Parkland, Fla.; Doug Guidry, Macomb, Mich.

[73] Assignee: Dr. Ing. h.c.F. Porsche AG, Weissach, Germany

[21] Appl. No.: 572,071

[22] Filed: Dec. 14, 1995

[51] Int. Cl.[6] .................................................. B23P 15/00
[52] U.S. Cl. .................. 29/897.2; 296/195; 296/197; 29/469; 29/458
[58] Field of Search .................................... 29/897.2, 469, 29/458; 296/193, 195, 196, 197, 203

[56] References Cited

U.S. PATENT DOCUMENTS

| | | | |
|---|---|---|---|
| 3,590,936 | 7/1971 | Wessells, III | 296/195 |
| 4,900,683 | 2/1990 | Kumasaka et al. | 296/197 |
| 4,988,121 | 1/1991 | Yoshii | 296/195 |
| 5,020,846 | 6/1991 | Bonnett | 296/203 |
| 5,123,696 | 6/1992 | Watari | 296/195 |
| 5,174,628 | 12/1992 | Hayatsugu et al. | 296/195 |
| 5,350,214 | 9/1994 | Yamauchi et al. | 296/195 |
| 5,641,193 | 6/1997 | Zepnik et al. | 296/197 |

*Primary Examiner*—Larry I. Schwartz
*Assistant Examiner*—Marc W. Butler
*Attorney, Agent, or Firm*—Evenson, McKeown, Edwards & Lenahan, PLLC

[57] ABSTRACT

In the area of the rearward wheel houses, a body structure for a convertible has a transversely extending rear wall which is connected to the floor and the two wheel houses and which is supported on the forward body by way of longitudinally directed, laterally exterior members. For reducing the cost, the weight and the processing time in the manufacturing of the body structure shell or frame, it is provided that the rear wall, including the provided reinforcements as well as the two longitudinally directed members, are combined to form a prefabricated module which is mounted into the vehicle only after the surface treatment of the remaining body structure in the finishing operation or an intermediate station.

20 Claims, 3 Drawing Sheets

PROCESS FOR MANUFACTURING A BODY STRUCTURE FOR A CONVERTIBLE

BACKGROUND AND SUMMARY OF THE INVENTION

This invention relates to a process for manufacturing a body structure for a vehicle, particularly a convertible, which has a transversely extending rear wall in the area of the rearward wheel houses connected to the bottom and the wheel houses, the rear wall being supported on forward body structure by way of longitudinally directed, laterally exterior members.

In the case of a known body structure of the initially mentioned type (for example, the new Daimler-Benz Roadster, Model 129 described in an article "The New Mercedes-Benz Roadster—Body: Passive Safety" in ATZ 91 (1989)5, Pages 227 to 235), the rear wall, including the two longitudinally directed, laterally exterior members, is mounted during the manufacturing of the shell and is welded to the adjoining body parts. The rear wall and the longitudinally directed members are made of steel plate and therefore have a relatively high weight. After the manufacturing of the shell, the whole body structure is subjected to surface treatments of prime-coating and painting.

It is an object of the invention to provide a process for manufacturing a body structure for a convertible in which cost and weight are saved and the processing time during the shell manufacturing is reduced.

According to the invention, this object is achieved by a process for manufacturing, comprising forming a prefabricated module separate from remaining body structure, which prefabricated module includes the rear wall and two longitudinally directed laterally exterior members, surface treating the remaining body structure, and subsequently connecting the prefabricated module to the remaining body structure.

Principal advantages achieved by means of the invention are that, by separating a part of the structure (rear wall module) from the shell manufacturing and by forming a prefabricated, easily mountable module, costs are reduced in the manufacturing of the shell because high-expenditure welding operations of the rear wall are no longer required. At the same time, the processing time during the manufacturing of the shell is reduced considerably. The investment costs are also reduced. The combining of shell components in a subassembly and the manufacturing in light metal or plastic results in a considerable reduction of weight of up to 25%.

The module containing the rear wall in certain preferred embodiments also contains other components, such as three-point seat belts, rollover protection devices, loudspeakers, cover locks, seals, and the like, in which case the complete module may be furnished as a preassembled unit from an external supplier.

Other objects, advantages and novel features of the present invention will become apparent from the following detailed description of the invention when considered in conjunction with the accompanying drawings.

DETAILED DESCRIPTION OF THE DRAWINGS

Figure 1:
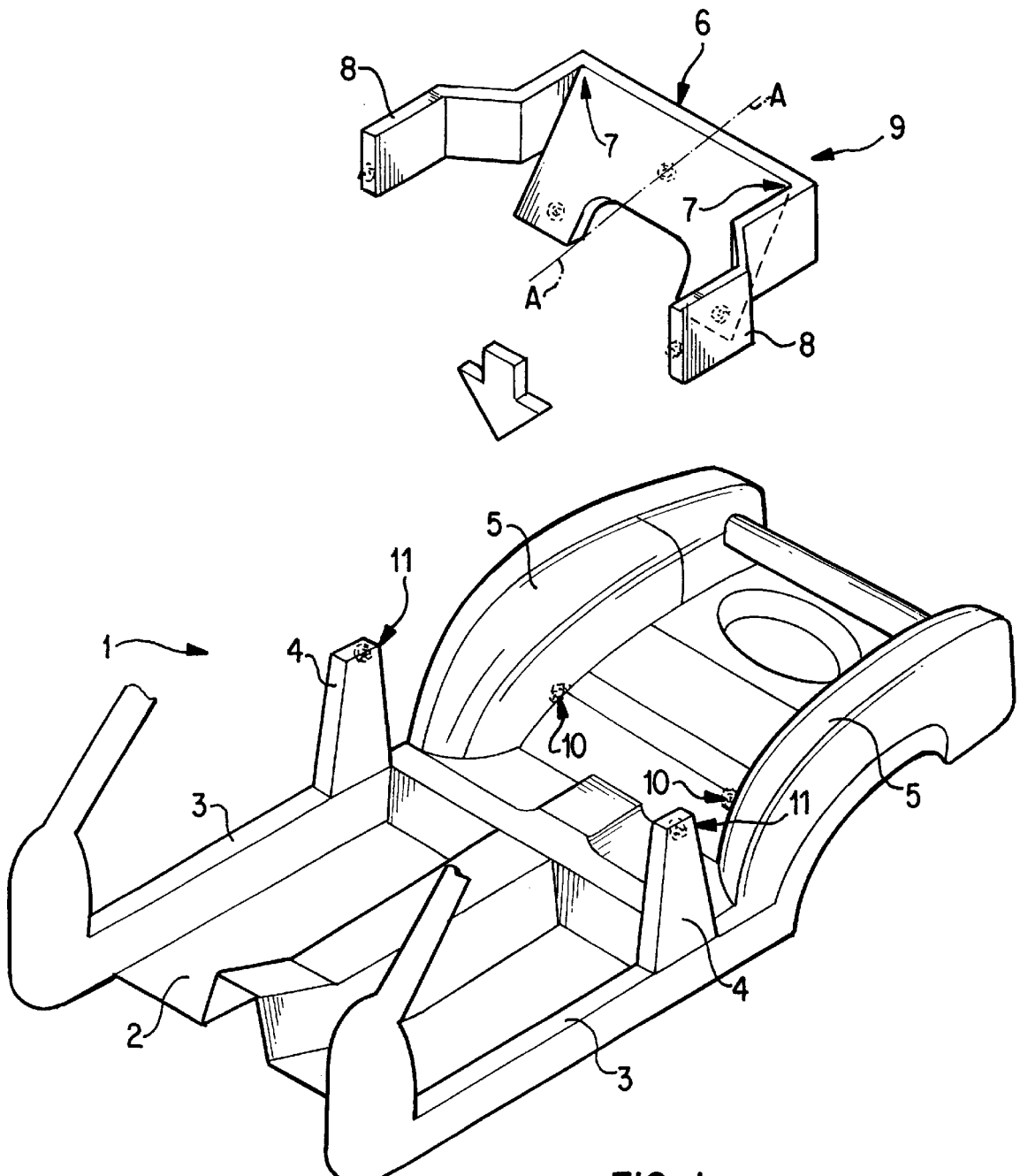
FIG. 1 is an exploded representation of a body structure with a prefabricated rear wall module, constructed according to a preferred embodiment of the present invention.
Figure 2:
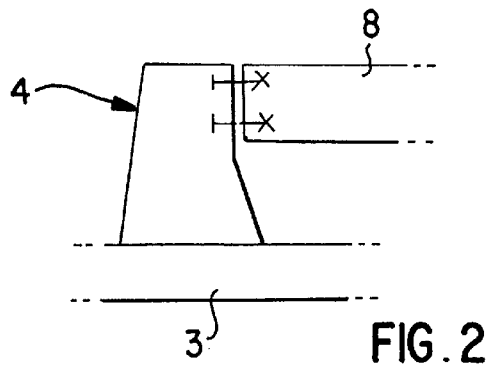
FIG. 2 is a lateral schematic view depicting fastening of the module on the B-column of the convertible according to preferred embodiments of the present invention.
Figure 3:
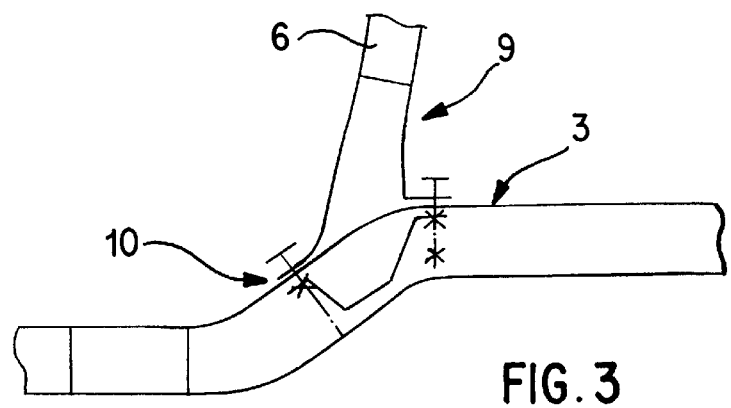
FIG. 3 is a lateral schematic view depicting fastening of the module on the floor of the convertible according to preferred embodiments of the present invention.

FIG. 1 illustrates a partial area of a body structure 1 for a vehicle which is formed as a convertible and comprises a floor 2, lateral side rails 3, B-columns 4 and rearward wheel houses 5. In the area of the rearward wheel houses 5, a transversely extending rear wall 6 is provided which is connected to the floor 2 and to the wheel houses 5. On both upper laterally exterior areas 7, the rear wall 6 is supported by way of longitudinally directed members 8 on the body structure disposed in front. According to the invention, the rear wall 6, including the provided reinforcements and the two longitudinally directed members 8, are combined to form a prefabricated module 9 which is manufactured outside the shell manufacturing operation for the remaining body structure.

The prefabricated module 9 is not mounted in the vehicle before the surface treatment (prime coating, painting) of the remaining body structure 1 has been carried out in an intermediate station or in the finishing stage. In the embodiment shown, the module 9 is connected with the floor 2 location depicted by at reference number 10 and with the two B-columns 4 at reference number 11. The module 9 is connected with the B-columns 4 and floor 2 with threaded connectors, such as screws, bolts, or the like, in certain contemplated embodiments. In other contemplated embodiments, the module 9 is connected with the B-columns 4 and floor 2 with an adhesive, such as glue. Embodiments are also contemplated where the module 9 is connected with the floor structure 2 and the B-columns by combination of threaded and adhesive connections.

In order to reduce weight, the prefabricated module 9 is preferably manufactured in a light metal construction or is made in one piece of plastic. In order to reduce weight and improve stiffness, the rear wall 6 as well as the longitudinally extending members 8 of the module 9 are constructed as hollow members The module 9 forms a transverse reinforcement of the body structure 1.

In addition, in the area of a longitudinal center plane A—A of the vehicle, the module 9 is connected with the body structure disposed behind it (such as a folding-top compartment). Without the inserted module, the vehicle has such a rigidity that it can be moved without problems through the paint shop to the surface treatment.

Figure 4:
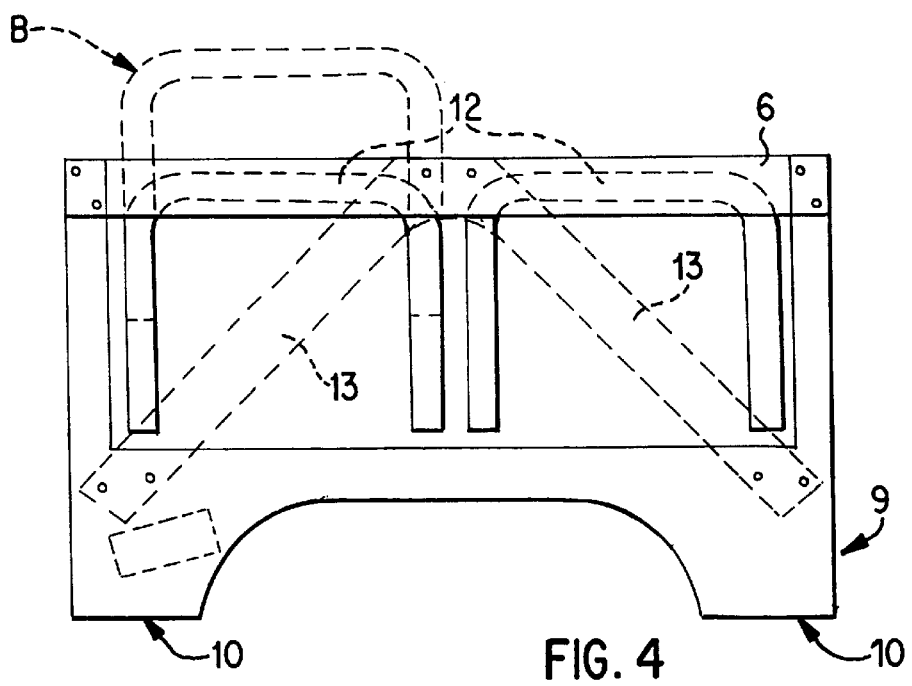
FIG. 4 is a frontal schematic view of a module formed according to a preferred embodiment of the present invention with an integrated rollover protection device.

Furthermore, a number of add-on pieces may be integrated into the module 9 according to various contemplated embodiments of the invention illustrated in FIGS. 4 to 7. According to FIG. 4, rollover protection devices 12 which can be moved out in the vertical direction are housed in a hollow space of the rear wall 6 of the module 9, only one of these rollover protection devices being shown in the moved-out position B. The rear wall 6 according to FIG. 4 is also provided with diagonally extending reinforcements 13.

Figure 5:
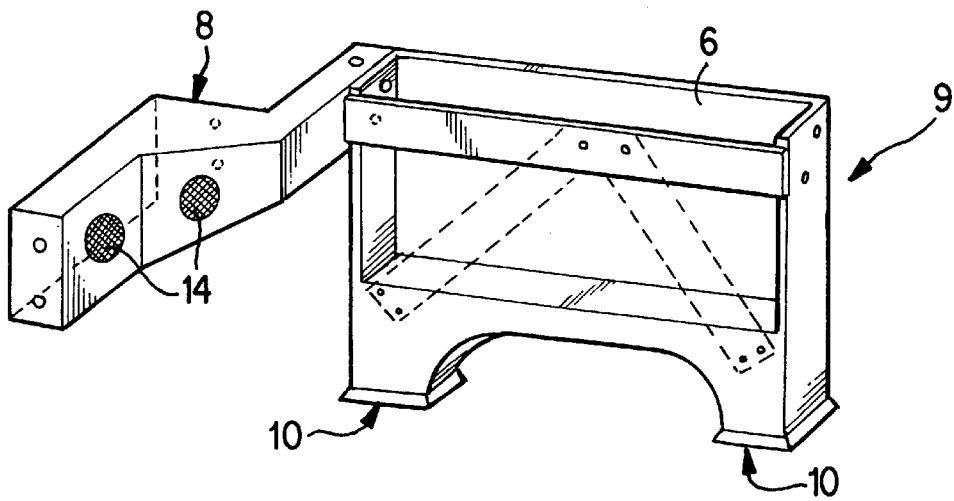
FIG. 5 is a diagonal schematic view of another module formed according to a preferred embodiment of the present invention with integrated loudspeakers.
Figure 6:
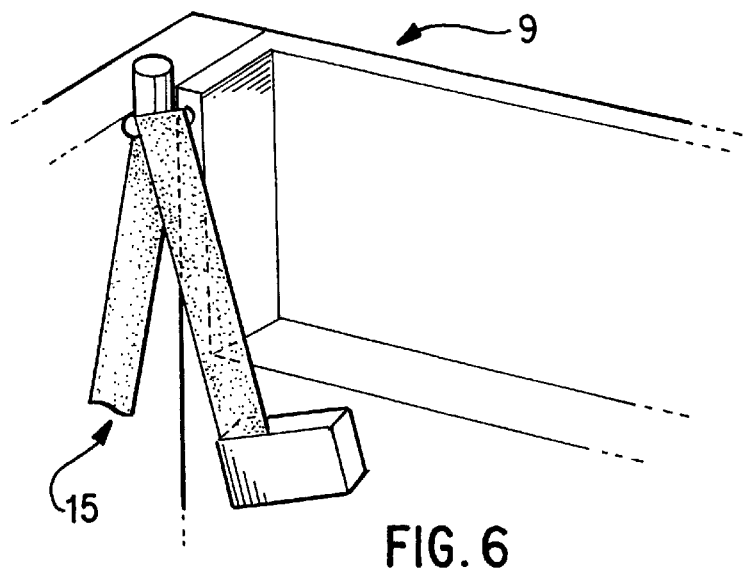
FIG. 6 is a diagonal schematic view of another module formed according to a preferred embodiment of the present invention with an integrated seat belt.
Figure 7:
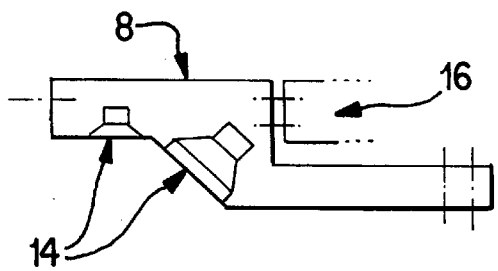
FIG. 7 is a top schematic view of a longitudinally extending member of a module formed according to a preferred embodiment of the present invention with integrated loudspeakers and a folding-top base fastened therein.

In FIG. 5, loudspeakers 14 are housed locally in the area of the approximately horizontally aligned, longitudinally extending members 8 of the module 9. In addition, three-point seat belts 15 or parts thereof (such as belt retractors, belt deflection element) may be provided at the module 9 shown in FIG. 6. Corresponding to FIG. 7, a folding-top base 16 for a folding top or convertible top, which is not shown in detail, is fastened to member 8 of the module 9. In the top view, the members 8 are bent at right angles, the end facing the rear wall 6 being situated farther toward the inside of the vehicle than the end facing the B-column 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for manufacturing a body structure for a convertible which has two vehicle rearward wheel houses, a floor, and a vehicle forward body section, said process comprising the steps of:

forming a prefabricated module separate from a remaining body structure which includes at least the wheel houses, the floor, and the vehicle forward body section, said prefabricated module including a transversely extending rear wall and two longitudinally directed laterally exterior members, surface treating the remaining body structure, and subsequently connecting connection locations on the transversely extending rear wall of the prefabricated module to connection locations on the floor of the remaining body structure.

2. Process for manufacturing a body structure according to claim 1, wherein said remaining body structure further includes a pair of B-columns, and wherein said connecting of the prefabricated module to the remaining body structure also includes connecting the longitudinally directed laterally exterior members with said B-columns of the remaining body structure and is by way of at least one of threaded connections and adhesive connections.

3. Process for manufacturing a body structure according to claim 2, wherein the prefabricated module is made of light metal.

4. Process for manufacturing a body structure according to claim 2, wherein the prefabricated module is made of plastic.

5. Process for manufacturing a body structure according to claim 2, wherein rollover protection devices, which can be selectively moved out to operative positions during driving, are integrated into the prefabricated module.

6. Process for manufacturing a body structure according to claim 2, wherein a loudspeaker is installed on the prefabricated module in the area of the longitudinally directed members.

7. Process for manufacturing a body structure according to claim 2, wherein three-point seat belts of a seat belt system are mounted on the prefabricated module.

8. Process for manufacturing a body structure according to claim 2, wherein the prefabricated module is formed with the laterally exterior members extending forward from the rear wall, and wherein the rear wall is connected to the floor and the laterally exterior members are connected to the B-columns.

9. Process for manufacturing a body structure according to claim 1, wherein the prefabricated module is made of light metal.

10. Process for manufacturing a body structure according to claim 1, wherein the prefabricated module is made of plastic.

11. Process for manufacturing a body structure according to claim 1, wherein rollover protection devices, which can be selectively moved out to operative positions during driving, are integrated into the prefabricated module.

12. Process for manufacturing a body structure according to claim 11, wherein a loudspeaker is installed on the prefabricated module in the area of the longitudinally directed members.

13. Process for manufacturing a body structure according to claim 12, wherein three-point seat belts of a seat belt system are mounted on the prefabricated module.

14. Process for manufacturing a body structure according to claim 1, wherein a loudspeaker is installed on the prefabricated module in the area of the longitudinally directed members.

15. Process for manufacturing a body structure according to claim 1, wherein three-point seat belts of a seat belt system are mounted on the prefabricated module.

16. Process for manufacturing a body structure according to claim 1, wherein said connecting of the prefabricated module to the remaining body structure is by way of threaded connections.

17. Process for manufacturing a body structure according to claim 1, wherein said connecting of the prefabricated module to the remaining body structure is by way of an adhesive connection.

18. Process for manufacturing a body structure for a convertible which has two vehicle rearward wheel houses and a floor, said process comprising the steps of:

forming a prefabricated module consisting of two longitudinally directed laterally exterior members and a rear wall extending transversely between said exterior members, surface treating a remaining body structure including at least the wheel houses and the floor, and subsequently connecting the prefabricated module to the remaining body structure.

19. Process for manufacturing a body structure according to claim 18, wherein said remaining structure further includes a pair of B-columns, and wherein in said connecting step the prefabricated module is connected to at least the B-columns and the floor.

20. Process for manufacturing a body structure according to claim 19, wherein in said forming step the prefabricated module is formed with the laterally exterior members extending forward from the rear wall, and wherein in said connecting step the rear wall is connected to the floor and the laterally exterior members are connected to the B-columns.

* * * * *